United States Patent [19]

Burch

[11] 4,120,436
[45] Oct. 17, 1978

[54] GUN RACK FOR A VEHICLE

[75] Inventor: Delwin L. Burch, Graham, Tex.

[73] Assignee: The Raymond Lee Organization, Inc., New York, N.Y. ; a part interest

[21] Appl. No.: 845,266

[22] Filed: Oct. 25, 1977

[51] Int. Cl.² ............................................. B62J 7/00
[52] U.S. Cl. .............................. 224/42.1 C; 224/1 R; 211/64; 248/316 R
[58] Field of Search ..................... 224/42.1 C, 42.1 R, 224/29 R, 29 A, 42.45 R, 42.46 R, 42.42 R, 1 R; 296/37.7, 37.8; 211/64, 60, 87; 248/316 R, 319 R, 305, 306, 304; 24/2.5, 3 R, 3 J

[56] References Cited

U.S. PATENT DOCUMENTS 3,022,898  2/1962  Loeb ..................................... 211/64
3,847,316  11/1974  McInnes ......................... 224/42.1 C Primary Examiner—Kenneth W. Noland
Attorney, Agent, or Firm—Daniel Jay Tick

[57] ABSTRACT

A pair of C-type open hook members extend from a first surface of a plank-type member in spaced parallel relation with each other at intermediate points between the ends of the member. The hook members releasably support a rifle at points thereof between the barrel and stock. A pair of bands of soft material are mounted on the first surface of the member at the opposite ends thereof. A fastening device affixes the member to the roof of a vehicle in the cab of the vehicle parallel to the upper edge of the windshield with the opposite surface of the member abutting the roof whereby the member releasably supports a rifle in the hook members thereof with the bands preventing scratching of the stock and barrel.

3 Claims, 3 Drawing Figures

GUN RACK FOR A VEHICLE

BACKGROUND OF THE INVENTION

The present invention relates to a gun rack for a vehicle. More particularly, the invention relates to a gun rack for a vehicle having a cab, a roof covering the cab and a windshield at the front of the cab extending along the width of the roof from side to side thereof, the windshield having an upper edge substantially joining the roof and extending parallel thereto.

Objects of the invention are to provide a gun rack for a vehicle, which gun rack is of simple structure, inexpensive in manufacture, mounted in a vehicle with facility, convenience and rapidity, and functions efficiently, effectively and reliably to provide a rifle, handy for immediate use and yet kept out of sight in a vehicle so that it does not tempt a would-be thief. This is especially important in ranch areas, where a rifle is a necessary item, and yet the rancher or ranch hand is often in a populated area of business.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
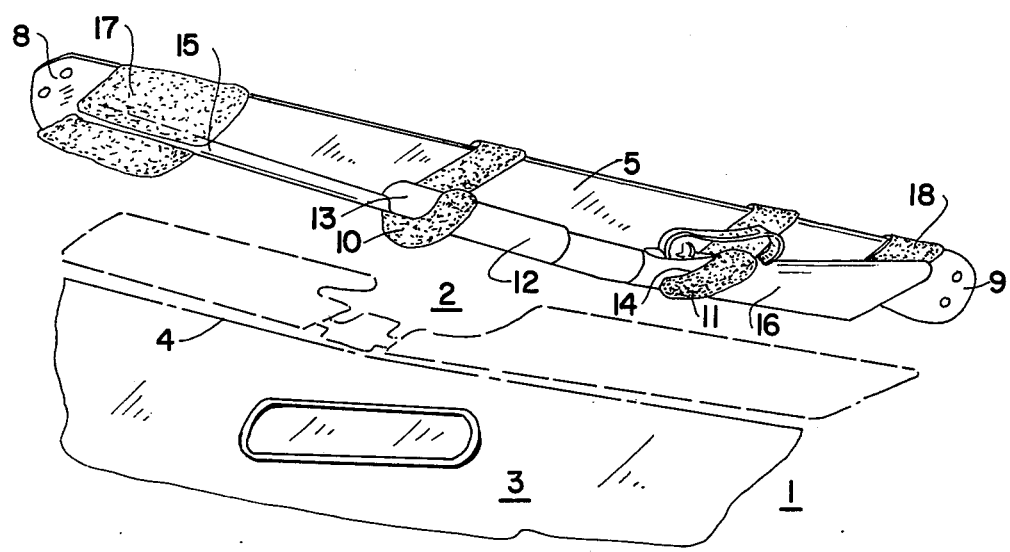
FIG. 1 is a perspective view of an embodiment of the gun rack of the invention in use.

The gun rack of the invention is for a vehicle having a cab 1, a roof 2 covering the cab and a windshield 3 at the front of the cab extending along the width of the roof from side to side thereof, as shown in FIG. 1. The windshield 3 has an upper edge 4 substantially joining the roof 2 and extending parallel to said roof, as shown in FIG. 1.

Figure 2:
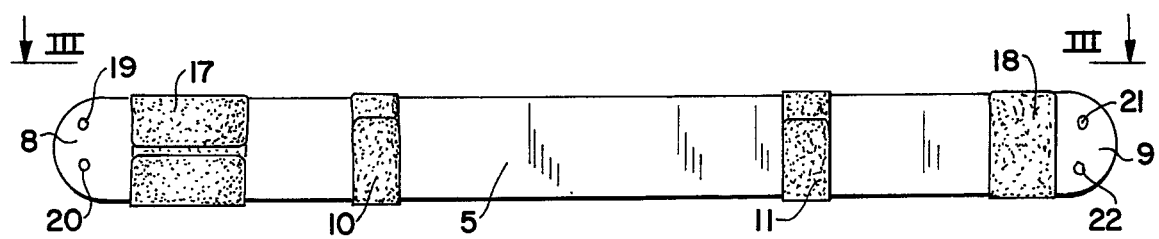
FIG. 2 is a top plan view of the embodiment of FIG. 1.
Figure 3:
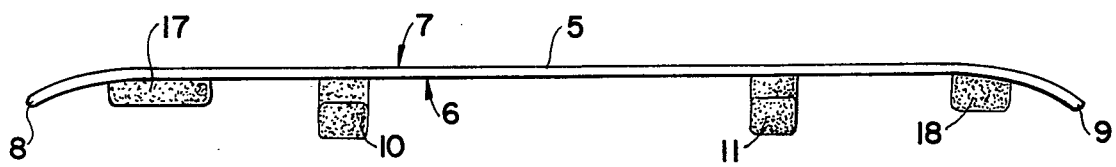
FIG. 3 is a side view, taken along the lines III—III, of FIG. 2.

The gun rack of the invention comprises a plank-like member 5 of any suitable material such as, for example, wood, plastic, or the like, having spaced opposite first and second substantially planar surfaces 6 and 7 (FIG. 3) and spaced opposite first and second ends 8 and 9 (FIGS. 1 to 3).

A pair of C-type open hook members 10 and 11 extend from the first surface 6 of the member 5 in spaced substantially parallel relation with each other at intermediate points between the first and second ends 8 and 9 thereof, as shown in FIGS. 1 to 3. The hook members 10 and 11 releasably support a rifle 12 at points 13 and 14 thereof between the barrel 15 and the stock 16, as shown in FIG. 1.

A first band 17 of soft material such as, for example, sheepskin, or the like, is mounted on the first surface 6 of the member 5 at the first end 8 thereof. A second band 18 of soft material such as, for example, sheepskin, or the like, is mounted on the first surface 6 of the member 5 at the second end 9 thereof (FIGS. 1 to 3).

The open hook members 10 and 11 are covered with the same soft material, such as, for example, sheepskin, or the like, to prevent scratching of the rifle 12. The band 17 is split, as shown in FIGS. 1 and 2, to accommodate the barrel 15 of the rifle 12 when it is supported by the member 5.

A fastening device of any suitable type such as, for example, a plurality of bores 19, 20, 21 and 22, formed through the member 5 at the first and second ends 8 and 9, (FIG. 2) is utilized to affix said member to the roof 2 in the cab 1 substantially parallel to the upper edge 4 of the windshield 3, as shown in FIG. 1, with the second surface 7 of the member abutting the roof. The member 5 thus releasably supports a rifle 12 in the hook members 10 and 11 thereof with the first and second bands 17 and 18 preventing scratching of the barrel 15 and the stock 16 of the rifle and with the rifle out of sight of a passerby, but within reach for immediate use.

While the invention has been described by means of a specific example and in a specific embodiment, I do not wish to be limited thereto, for obvious modifications will occur to those skilled in the art without departing from the spirit and scope of the invention.

I claim:

1. A gun rack for a vehicle having a cab, a roof covering the cab and a windshield at the front of the cab extending along the width of the roof from side to side thereof, the windshield having an upper edge substantially joining the roof and extending parallel thereto, said gun rack comprising
   a plank-like member having spaced opposite substantially planar first and second surfaces and spaced opposite first and second ends;
   a pair of C-type open hook members extending from the first surface of the member in spaced substantially parallel relation with each other at intermediate points between the first and second ends thereof, said hook members releasably supporting a rifle at points thereof between the barrel and stock;
   a first band of soft material on the first surface of the member at the first end thereof;
   a second band of soft material on the first surface of the member at the second end thereof; and
   fastening means affixing the member to the roof in the cab substantially parallel to the upper edge of the windshield with the second surface of the member abutting said roof whereby said member releasably supports a rifle in the hook members thereof with the first and second bands preventing scratching of the stock and barrel.

2. A gun rack as claimed in claim 1, wherein the open hook members are covered with soft material to prevent scratching of a rifle supported thereby.

3. A gun rack as claimed in claim 1, wherein one of the first and second bands is split to accommodate the barrel of a rifle supported by the member.

* * * * *